United States Patent
Hwang

(10) Patent No.: US 11,256,819 B2
(45) Date of Patent: Feb. 22, 2022

(54) AUTHORIZED PRINTING

(71) Applicant: Hewlett-Packard Development Company, L.P., Spring, TX (US)

(72) Inventor: Peter G Hwang, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,017

(22) PCT Filed: May 14, 2018

(86) PCT No.: PCT/US2018/032510
§ 371 (c)(1),
(2) Date: Oct. 14, 2019

(87) PCT Pub. No.: WO2019/221695
PCT Pub. Date: Nov. 21, 2019

(65) Prior Publication Data
US 2021/0334393 A1    Oct. 28, 2021

(51) Int. Cl.
*G06F 21/60* (2013.01)
*G06F 3/12* (2006.01)
*G06F 21/31* (2013.01)

(52) U.S. Cl.
CPC .......... *G06F 21/608* (2013.01); *G06F 3/1238* (2013.01); *G06F 3/1267* (2013.01); *G06F 21/31* (2013.01)

(58) Field of Classification Search
None
See application file for complete search history.

(56) References Cited

U.S. PATENT DOCUMENTS

| 5,768,483 | A  | * | 6/1998 | Maniwa | H04L 41/08 |
|---|---|---|---|---|---|
| | | | | | 358/1.14 |
| 7,182,445 | B2 | * | 2/2007 | Johnson | B41J 2/17546 |
| | | | | | 347/19 |
| 7,770,785 | B2 | | 8/2010 | Jha et al. | |
| 8,346,903 | B2 | | 1/2013 | Shepherd | |
| 8,780,377 | B2 | | 7/2014 | Nishida et al. | |
| 2002/0083114 | A1 | | 6/2002 | Mazzagatte et al. | |
| 2004/0036903 | A1 | | 2/2004 | Azami | |
| 2006/0095369 | A1 | | 5/2006 | Hofi | |
| 2010/0269156 | A1 | | 10/2010 | Hohlfeld et al. | |
| 2013/0063774 | A1 | * | 3/2013 | Nuggehalli | G06F 3/1298 |
| | | | | | 358/1.15 |
| 2015/0153970 | A1 | | 6/2015 | Tomida et al. | |
| 2015/0199161 | A1 | | 7/2015 | Gutnik et al. | |
| 2018/0276006 | A1 | * | 9/2018 | Sambasivam | G06F 9/453 |
| 2019/0082046 | A1 | * | 3/2019 | Carbune | G06F 16/951 |

FOREIGN PATENT DOCUMENTS

| CN | 107957856 A | 4/2014 |
|---|---|---|
| EP | 2990934 A1 | 2/2016 |
| JP | 2016207105 A | 12/2016 |

* cited by examiner

*Primary Examiner* — Frantz Bataille
(74) *Attorney, Agent, or Firm* — Brooks Cameron & Huebsch PLLP

(57) ABSTRACT

In some examples, a memory resource may store non-transitory machine-readable instructions executable by a processing resource to authenticate a user, authorize the authenticated user at an imaging device for a finite amount of time and during the finite amount of time, automatically route a plurality of print jobs to a queue and automatically release the plurality of print jobs.

14 Claims, 5 Drawing Sheets

AUTHORIZED PRINTING

BACKGROUND

Imaging systems, such as printers, copiers, etc., may be used to form markings on a physical medium, such as text, images, etc. Imaging systems may form markings on the physical medium by transferring a print substance (e.g., ink, toner, etc.) to the physical medium. The imaging systems may form the markings based on information included in a print job.

DETAILED DESCRIPTION

Imaging devices may form markings on a physical medium (e.g., paper, photopolymers, plastics, composite, metal, wood, etc.) by transferring a print substance (e.g., ink, toner, etc.) to the physical medium. As used herein, the term "imaging device" refers to a hardware device with functionalities to a physically produce representation(s) of text, images, models, etc. on a physical medium. Examples of imaging devices include ink/toner printers and/or three-dimensional printers, among other types of imaging devices.

Some approaches may employ "push" generation of documents. When employing "push" generation the documents may be generated at an imaging device based on data (e.g., a print job) received from a computing device. However, if a user is not in a vicinity of the imaging device, such "push" generation of documents may present a security concern as the documents generated at the imaging device may be left unattended for a period of time. For instance, the documents generated at the imaging device may be left unattended while a user navigates from the computing device to the imaging device and retrieves the documents.

Other approaches may employ "pull" generation of documents. When employing "pull" generation a print job may be stored in a print queue such as a queue of an imaging device and/or a queue in a server such as cloud server or other physical server external to an imaging device. For instance, a print job may be stored in a queue until a user is physically present and/or provides the proper credentials at the imaging device where the document is to be generated. As a result, "pull" printing may impede productivity as users may spend time providing credentials to release a print job from the queue at the imaging device as well as waiting for the document to be generated by the imaging device.

Accordingly, the disclosure is directed to authorized printing. For example, authorized printing may include authentication of a user, authorization of the authenticated user at an imaging device for a finite amount of time, and during the finite amount of time, automatically routing a plurality of print jobs to a queue and automatically releasing the plurality of print jobs. As used herein, the terms "authorize" and "authorization" refer to providing a permission to user to automatically route print jobs to and automatically release the print jobs at a given imaging device for a finite amount of time (i.e., checking-in a given user at an imaging device), as described herein. That is, automatically routing and/or releasing print jobs as described herein avoids repeat authorizations of a given user during a finite amount of time and yet provides a secure authorized print experience.

Figure 1:
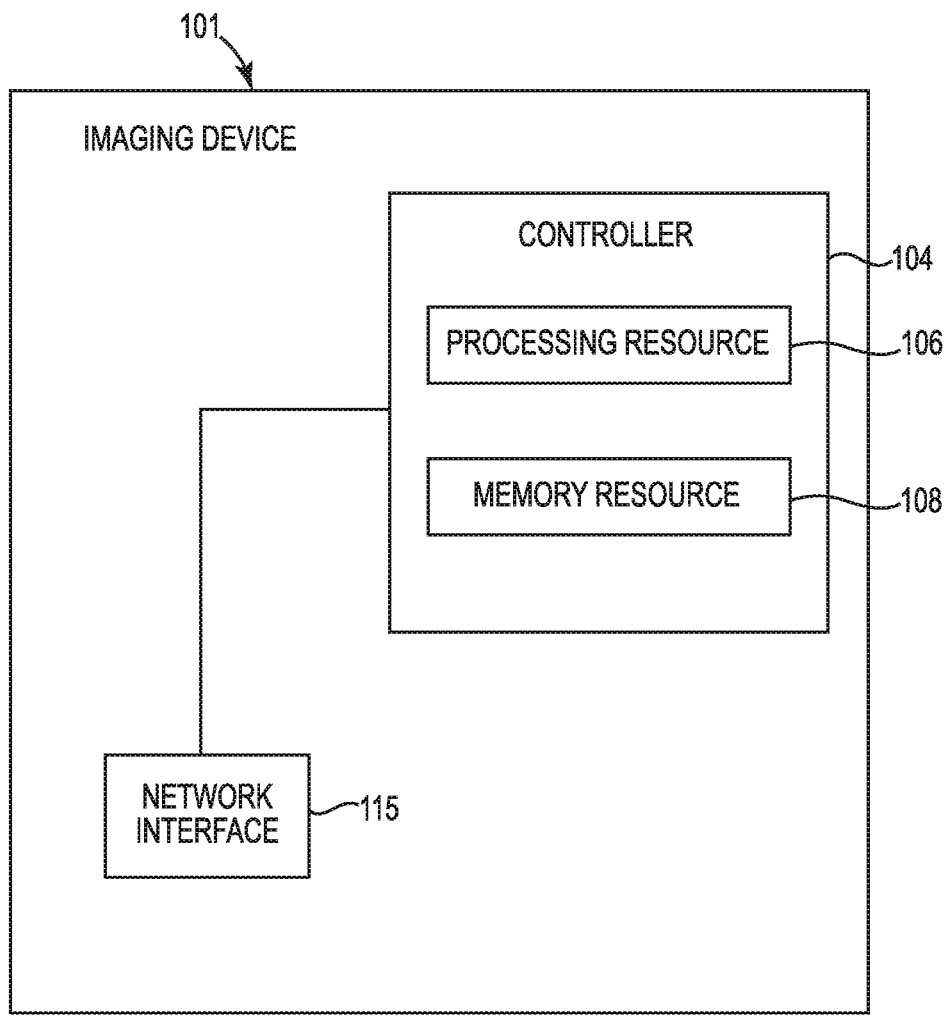
FIG. 1 illustrates an example of an imaging device consistent with the disclosure.

FIG. 1 illustrates an example of an imaging device 101 consistent with the disclosure. As mentioned, the imaging device 101 refers to a hardware device with functionalities to a physically produce representation(s) of text, images, models, etc. on a physical medium.

As illustrated in FIG. 1, the imaging device 101 may include a controller 104 and a network interface 115. The controller 104 includes hardware including a chip, an expansion card, and/or a stand-alone device such as a print server or other type of device external to the imaging device that interfaces with an imaging device to promote aspects of authorized printing, as described herein. The controller 104 may include a processing resource 106 and a memory resource 108.

As used herein, the processing resource 106 may be a central processing unit (CPU), a semiconductor-based microprocessor, and/or other hardware devices suitable for retrieval and execution of instructions stored in non-transitory computer readable medium (e.g., the memory resource 108). The processing resource 106 may fetch, decode, and execute instructions such as those described herein with respect to FIG. 2 and/or FIG. 3. As an alternative or in addition to retrieving and executing instructions, the processing resource 106 may include an electronic circuit that includes electronic components for performing the functionality of instructions. Processing resource 106 may be analogous or similar to processing resource 306 as describe herein with respect to FIG. 3.

As used herein, the memory resource 108 may also be referred to as a non-transitory computer readable medium, and may be a volatile memory (e.g., RAM, DRAM, SRAM, EPROM, EEPROM, etc.) and/or non-volatile memory (e.g., a HDD, a storage volume, data storage, etc.) The memory resource 108 may be analogous or similar to memory resource 208 and/or memory resource 308 as described herein with respect to FIGS. 2 and 3, respectively. Although the following descriptions refer to an individual processor and an individual memory, the descriptions may also apply to a system with multiple processors and multiple memories. In such examples, the instructions may be distributed (e.g., stored) across multiple memories and the instructions may be distributed (e.g., executed by) across multiple processors.

The network interface 115 can be connected to a network such as a wired or a wireless network. In some examples, the network may be a cellular network and/or a private local area network, among other possibilities. For instance, in some examples, the network may be a direct connection such as a BLUETOOTH® connection between the mobile device and the imaging device.

In any case, the network interface 115 may receive print data from the network. For example, the print data may be generated by a mobile device and received at the network interface 115 via the network. However, in some examples, the print data may be generated at another device associated with the mobile device. The other device may be a workstation or personal computer of a user of the mobile device. Print data may include a print job, an identifier, and/or an authorization, as described herein.

In some examples, the memory resource 108 may store print data received at the network interface 115. In some examples, the memory resource 108 may be encoded with executable instructions to operate the network interface 115 and/or other hardware. In some examples, the memory resource may be substituted with or at least partially substituted by a cloud-based storage system. The memory resource 108 may include a database (not illustrated). The database may store information relating to a plurality of imaging devices. For example, the database may include a list of the imaging devices and/or other information.

Figure 2:
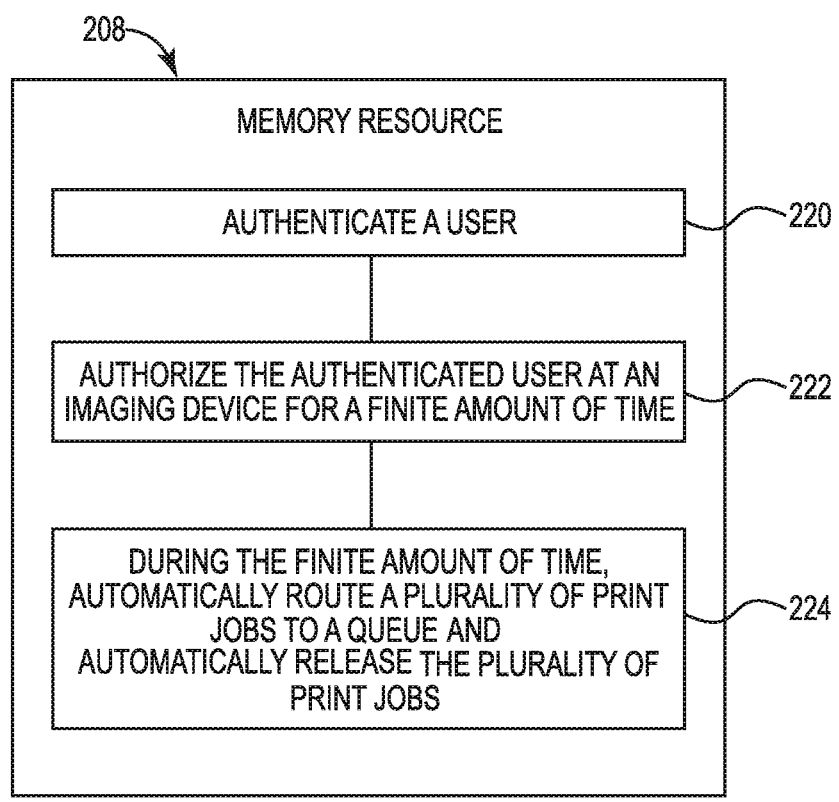
FIG. 2 illustrates an example of a memory resource storing non-transitory machine-readable instructions consistent with the disclosure.

FIG. 2 illustrates an example of a memory resource 208 resource storing non-transitory machine-readable instructions consistent with the disclosure. As mentioned, the memory resource 208 may be analogous or similar to the memory resource 108 and/or a memory resource 308 as described with respect to FIGS. 1 and 3, respectively.

In various examples, the memory resource 208 may include instructions 220 that are executable by a processing resource, such as those described herein, to authenticate a user. As used herein, the term "authenticate a user" refers to confirming a user is who they identify themselves as. For example, the authentication instructions may include instructions to request an input from the user including an identifier of the user. An input may be received via an imaging device and/or via a mobile device such as a laptop or mobile phone, among other possibilities. For instance, the input may be received via a graphical user interface of the imaging device or other component of an imaging device. Examples of identifiers include a personal identification number, a username and password, an identification card, a token, location information, a badge, and/or a biometric scan of the user, among other possibilities. Possible identifiers include those provided via a near field communication and/or BLUETOOTH® or other identifiers employed with a mobile device such as a mobile phone. That is, in some examples, the input may be received as a wireless token or other information provided via a wireless communication from a mobile device to the imaging device.

In any case, an identifier may be compared to a corresponding identifier of a given user. For instance, in some examples, the instructions may include instructions to compare the identifier to a corresponding identifier for a given user responsive to receipt of the identifier. The identifier may be compared with corresponding identifier stored in in a database or otherwise stored. If the identifier matches the corresponding identifier then the user is authenticated, and the user may be authorized, as described herein. Conversely, if the identifier does not match the corresponding identifier then the user is not authenticated, and a print job is stored in a queue and/or the print job is not routed to an imaging device, as described herein.

In various examples, the memory resource 208 may include instructions 222 that are executable by a processing resource, such as those described herein, to authorize the authenticated user at an imaging device for a finite amount of time. As mentioned, the term "authorize" refers to providing permission to user to automatically route print jobs to and automatically print the print jobs at a given imaging device for a finite amount of time. For instance, the instructions 222 may authorize the user responsive to authentication of the user, as described herein, among other possibilities. In some examples, the instructions 222 may authorize a user by storing information reflecting the authorization in a memory resource of an imaging device and/or storing information reflecting the authorization in a cloud resource and/or elsewhere.

The instructions 222 may maintain the authorization for a finite amount of time. As used herein, "maintain the authorization" refers to storing information in the imaging device or otherwise that authorizes a user to utilize the imaging device for a finite amount of time. For instance, the instructions may maintain the authorization for a plurality of print jobs during a finite amount of time.

As used herein, the term "a finite amount of time" refers to a period of time that may be preconfigured, specified by a user, and/or correspond to a condition such as amount of time a user is physically present within a given location and/or associated with a network. For instance, the instructions 222 may include instructions to authorize an authenticated user at an imaging device for a finite amount of time equal to a predetermined duration of time, an amount of time a user is physically present within a given location, and/or an amount of time a user is physically present within a given location, among other possibilities. That is, the instructions may include instructions to maintain the authorization for each print job of the plurality of print jobs during the finite amount of time. For instance, a first print job may be authorized and automatically routed, released and printed. A second print job may be sent (e.g., from a mobile device) after the first print job is printed and the second print job may be automatically routed, released and printed with the same authorization as the first print job even though the second print job was not initiated until after printing of the first print job.

As used herein, a "predetermined amount of time" refers to a period of time (given number of minutes, hours, days, etc.) that may be preconfigured or may be specified by a user. For instance, the predetermined amount of time may be a preconfigured amount of time (e.g., 2 hours) that may be automatically associated to a user that is authorized user at a given imaging device. However, in some examples, the predetermined amount of time may be specified to a particular amount of time, for instance by a user providing an input to a user interface of an imaging device and/or via a user interface of a mobile device. In some examples, the predetermined amount of time may be equal to 5 or more minutes. For instance, the predetermined amount of time may be equal to 5 minutes, 15 minutes, 30 minutes, 60 minutes, 120 minutes, 240 minutes, 480 minutes, 1 day, or 2 days, 2 months, until a day such as Friday of a given week, and/or until any future date/time.

As mentioned, in some example the finite amount of time may be equal to an amount of time a user is physically present within a given location. For example, a user may be located at a given location such as a particular building and/or within a given geofence. A physical location may be determined based on a global positioning system coordinate such as a GPS coordinate of a mobile device at a given time and/or a user employing a badge or other identifier to log into the given location, among other possibilities. For instance, logging into a location may correspond to a beginning of an amount of time a user is physically present at the given location. The user may log out of the given location by employing a badge or other identifier. The user logging out of the given location may correspond to an end of an amount of time the user is physically present at the given location. Stated differently, in such examples, the finite amount of time may be equal to an amount of time from a user being initially physically present at a given location to the user logging out from the given physical location.

In some examples, the finite amount of time may be equal to an amount of time a user is schedule to be physically present within a given location. For instance, a user may be authorized for a duration of a scheduled work shift of the user (e.g., from 9 to 5 on Monday). A network administrator, building control system, or other entity could maintain such scheduling information and authorize a user for a duration of a scheduled work shift for each of a plurality of work shifts.

In some examples, a finite amount of time could be based on a calendar of a user. For instance, an authorization may "follow" a user to correspond to an imaging device at or near a location specified in a calendar event. For instance, a user may be authorized at a first imaging device at a location of a first calendar event for a first finite amount of time. At the end of the scheduled calendar event, the authorization may move to a second imaging device at a location of a second calendar event having a second finite amount of time, among other possibilities.

Alternatively, in some examples, a finite amount of time may equal to an amount of time between a user being authorized at a first imaging device on a network and the user being authenticated at a second imaging device on the network, irrespective of calendar information of the user. In some examples, a finite amount of time may be equal to an amount of time elapsed from a user being authorized on an imaging device until the user revokes the authorization (e.g., by providing an input to the imaging device and/or a mobile device).

As mentioned, in some example the finite amount of time may be an amount of time a user is associated with a network. As used herein, being associated with a network refers to being connected to a network (i.e., having network connectivity) such as being associated with a given wireless access point of a wireless network and/or connected to a physical interface of a local area network. For example, a user may be associated with a network such as a wireless network based on a user employing a mobile device such as a mobile phone to associate with an access point on the wireless network.

In some examples, associating with the access point on the network may correspond to a beginning of an amount of time a user is connected to a network. The user may disassociate from an access point or otherwise disconnect from the network. The user disconnecting from the network may correspond to an end of an amount of time the user is connected to the network. Stated differently, in such examples, the finite amount of time may be equal to an amount of time from a user connecting to a network to the user disconnecting from the network.

In various examples, the memory resource 208 may include instructions 224 executable by a processing resource, such as those described herein, that during the finite amount of time, automatically route a plurality of print jobs to a queue such as a queue in the imaging device and automatically release the plurality of print jobs. As used herein, the term "automatically route" refers to sending a print job from a device such as a mobile device to an imaging device without additional authorization of the user sending the print job. Stated differently, a user may batch authorize a plurality of print job (including printing jobs which may have not yet been requested and/or a plurality of print jobs which may be stored in a queue) during a finite amount of time without additional authorization of the user sending the plurality of print jobs.

As used herein, the term "automatically release" refers to generating content in a print job at an imaging device without additional authorization of the user sending the print job. That is, the instructions may include instructions to maintain the authorization for each print job of the plurality of print jobs during the finite amount of time, as described herein. In this manner, the instructions 224 may automatically route and automatically release a print job sent by a user of a mobile device to an imaging device so the generated documents will be available for pickup when the user of the mobile device arrives at the imagining device and/or when the user arrive at a given physical location such as within a given geofence. For instance, a print job may be automatically routed and/or released based on the user's location and/or other relevant metadata.

For example, a user's print jobs may be automatically released to a cardiology department imaging device responsive to determination a user is physically located in the geo-fence of the cardiology department. Whereas when the user is in a geo-fence of an imaging device in an oncology department, the user's print job may be automatically routed and/or released to the imaging device in the oncology department instead of being automatically routed and/or released by the imaging device in the cardiology department.

Figure 3:
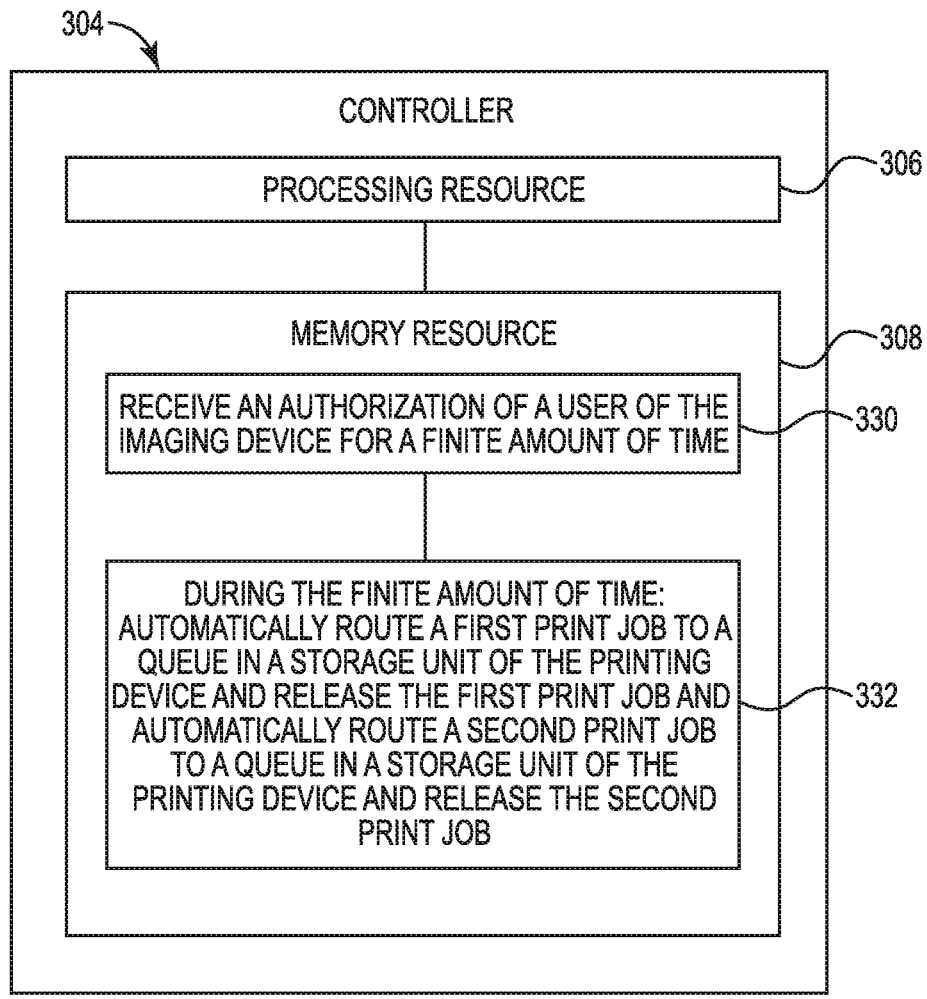
FIG. 3 illustrates an example of a controller consistent with the disclosure.

FIG. 3 illustrates an example of a controller 304 consistent with the disclosure. The controller 304 may be analogous or similar to controller 104 as described with respect to FIG. 1. As illustrated in FIG. 3, the controller 304 may include a processing resource 306 and a memory resource 308.

In various examples, the memory resource 308 may include instructions 330 that are executable by the processing resource 306 to receive, via the network interface, an authorization of a user of the imaging device for a finite amount of time. That is, a user may be authorized by the imaging device or may be authorized by another entity that is coupled via a network to the imaging device.

In various examples, the memory resource 308 may include instructions 332 that are executable by the processing resource 306 that during the finite amount of time automatically route a first print job to a queue and release the first print job and automatically route a second print job to a queue, for instance, a queue in a storage unit of the imaging device and release the second print job. That is, as mentioned an authorization may be maintained for the finite period of time to permit a plurality of print jobs such as the first print job and the second print job each be automatically routed and released. As such, authorized printing as described herein permits automatically routing and releasing a plurality of print jobs without prompting a user or otherwise obtaining a subsequent authorization of the user during the finite amount of time.

In some examples, the controller 304 may include instructions to automatically release a print job responsive to receipt of the print job in a queue such a queue of the imaging device. For instance, the controller may include instructions to automatically release the first print job responsive to the automatic routing to the imaging device. In such examples, the imaging device may generate documents based on the information in the first print job responsive to the release of the first print job. Similarly, in some examples the controller 304 may include instructions to automatically release a second print job responsive to the automatic routing to the imaging device. That is, in some examples the controller may include instructions to automatically release the first print job and/or the second print job in the absence of an additional authorization (as the authorization may be maintained during the finite amount of time). However, the disclosure is not so limited.

Rather, in some examples the controller 304 may include instructions to retain a print job in the queue. For instance, the instructions may include instruction to retain a print job in a queue of the imaging device responsive to the print job being automatically routed to the imaging device. For instance, if the finite amount of time has ended or expired then a printing job may be stored in a queue of an imaging device, in the cloud-based server, and/or on an external server. In such examples, the controller 308 may include instructions to release the first print job responsive to a second authorization of the user at the imaging device and/or a different imaging device and the first print job responsive to a third authorization of the user at the imaging device.

Figure 4:
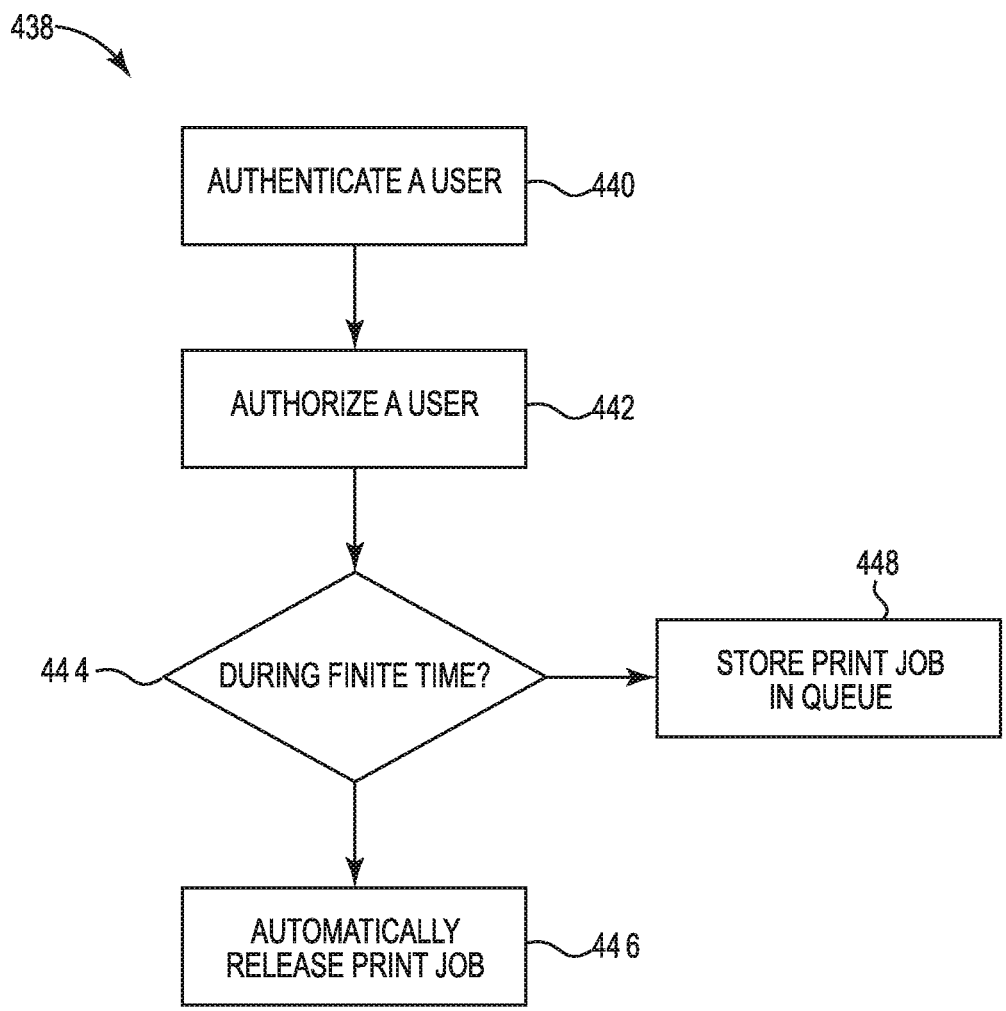
FIG. 4 illustrates an example of a flow chart consistent with the disclosure.

FIG. 4 illustrates an example of a method flow chart 438 consistent with the disclosure. At 440, a user may be authenticated, as described herein. If the user is not authenticated, the method 438 ends. If the user is authenticated the method may proceed to 442. At 442 the method may authorize a user, as described herein. If the user is not authorized the method 438 ends. For instance, in some examples, a user may not be authorized if the user is at a location in which the user is not authorized to use an imaging device, etc.

If the user is authorized the method may proceed to 444. At 444, the method may determine if the user is within a finite amount of time. The determination may be based on an amount of time elapsed from a time a user is initially authorized. For instance, if the user is at a time (e.g., 1 hour elapsed from a time the user is initially authorized) within a predetermined amount of time (e.g., 2 hours) then the user is determined to be within the finite amount of time. Similarly, it may be determined if a user is still physically present and/or still connected to a network to determine if a user is within a finite amount of time. If the determination is yes (that the user is still within the finite amount of time) then the method may proceed to 446. At 446 a print job sent by the user may be automatically released and documents may be generated.

Conversely, it may be determined that a present time (e.g., 3 hours elapsed from a time the user is initially authorized) is after the finite amount of time (e.g., 2 hours) has elapsed. Similarly, it may be determined if a user is no longer physically present and/or is no longer connected to a network to determine if the finite amount of time has elapsed. If the determination is no (that finite amount of time has elapsed) then the method may proceed to 446.

Figure 5:
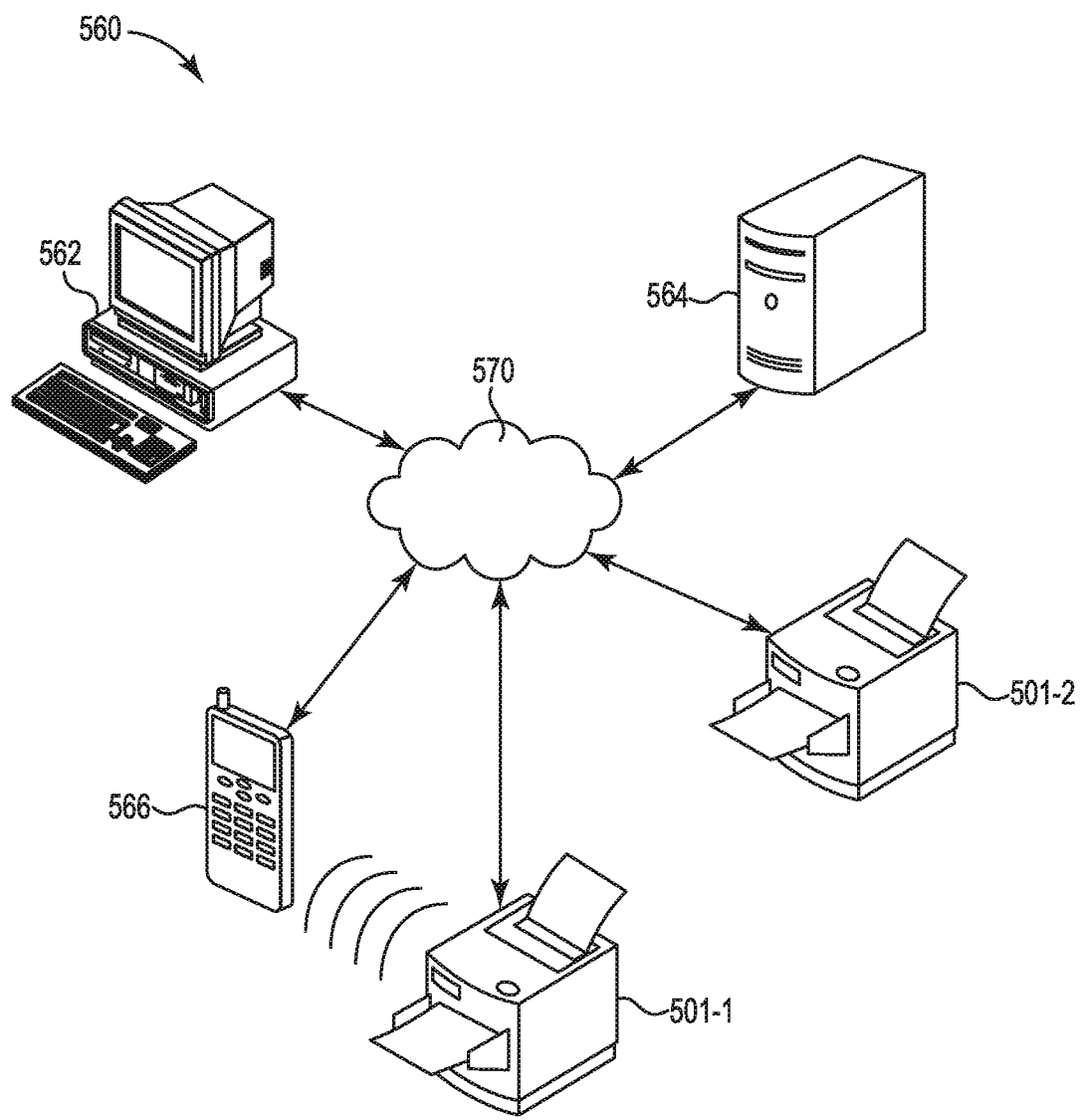
FIG. 5 is an example of an environment suitable for authorized printing consistent with the disclosure.

FIG. 5 is an example of an environment 560 suitable for authorized printing consistent with the disclosure. As illustrated in FIG. 5, the environment 560 may include imaging devices 501-1, 501-2, a computing device 562, server 564, a mobile device 566, and a network 570. The computing device 562 may be a desktop device and/or may be a mobile device. The server 564 may be a physical server located proximate to various devices such as the imaging devices 501-1, 501-2 and/or may be a cloud-based server which may be connected via the network 570 to various devices including those illustrated in FIG. 5. The mobile device 566 may be a laptop, a smartphone, a smartwatch, a desktop computer and/or a tablet, among other types of mobile devices. The network 570 may be local area network and may be a wired, wireless or a combination of wired and wireless.

A user of a computing device 562 and/or the mobile device 566 may send a print job to an imaging device such as imaging device 501-1 and/or may send a print job to different imaging device. For example, a user of the computing device 562 may send a print job to the server 564 via the network 570 while the user is located near the computing device 562 to operate the computing device 562. After sending the print job, the user may move toward the imaging device 515-1. In some examples, if the user is authorized at the imaging device 515-1 and within a finite amount of time the print job may be automatically routed via the network 570 and/or the server 564 to the imaging device 515-1 and automatically released from a queue such as a queue of the imaging device.

However, if the user is not authorized at an imaging device the print job may be stored in a queue such as a queue of the imaging device 515-1 until the user become authorized at an imaging device or the print job may be maintained in the network 570 and/or the server 564 and not routed to an imaging device until the user becomes authorized at an imaging device such as imaging device 515-1.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. Similar elements or components between different figures may be identified by the use of similar digits. For example, 104 may reference element "04" in FIG. 1, and a similar element may be referenced as 304 in FIG. 3. Elements illustrated in the various figures herein may be added, exchanged, and/or eliminated so as to provide a plurality of additional examples of the disclosure. In addition, the proportion and the relative scale of the elements provided in the figures are intended to illustrate the examples of the disclosure and should not be taken in a limiting sense. As used herein, "a plurality of" an element and/or feature may refer to more than one of such elements and/or features.

The above specification, examples and data provide a description of the method and applications and use of the system and method of the present disclosure. Since many examples may be made without departing from the spirit and scope of the system and method of the present disclosure, this specification merely sets forth some of the many possible example configurations and implementations.

What is claimed:

1. A memory resource storing non-transitory machine-readable instructions executable by a processing resource to:
   authenticate a user;
   authorize the authenticated user at an imaging device for a finite amount of time having a duration equal to a plurality of minutes; and
   during the finite amount of time, automatically route a plurality of print jobs to a queue and automatically release the plurality of print jobs responsive to the automatic routing to the imaging device.

2. The memory resource of claim 1, wherein the instructions to authorize include instructions to maintain the authorization for each print job of the plurality of print jobs.

3. The memory resource of claim 1, wherein the finite amount of time is equal to a predetermined duration of time.

4. The memory resource of claim 1, wherein the finite amount of time is equal to an amount of time a user device is connected to a network.

5. The memory resource of claim 1, wherein the finite amount of time is equal to an amount of time a user is physically present within a given location.

6. The memory resource of claim 1, wherein the finite amount of time is equal to an amount of time a user is scheduled to be physically present within a given location.

7. The memory resource of claim 1, wherein the finite amount of time is equal to an amount of time between a user being authorized at a first imaging device and the user being authenticated at a second imaging device.

8. The memory resource of claim 1, wherein the identifier includes a personal identification number, a wireless token, location information, a username, password, an identification card, a badge, biometric information, or combinations thereof.

9. A controller comprising:
a processing resource; and
a memory resource including a non-transitory machine-readable instructions executable by the processing resource to:
receive an authorization of a user of the imaging device for a finite amount of time having a duration equal to a plurality of minutes; and
during the finite amount of time:
automatically route a first print job to a queue in a storage unit of the imaging device and release the first print job responsive to the automatic routing to the imaging device; and
automatically route a second print job to a queue in a storage unit of the imaging device and release the second print job responsive to the automatic routing to the imaging device.

10. The controller of claim 9, further comprising instructions to automatically release the first print job and the second print job in the absence of an additional authorization.

11. An imaging device comprising:
a network interface; and
a controller including a processing resource and memory resource including a non-transitory machine-readable instructions executable by the processing resource to:
receive, via the network interface, an authorization of a user of the imaging device for a finite amount of time having a duration equal to a plurality of minutes;
during the finite amount of time:
automatically route, via the network interface, a first print job and a second print job to the imaging device;
release the first print job responsive to the automatic routing to the imaging device; and
release the second print job responsive to the automatic routing to the imaging device.

12. The imaging device of claim 11, further comprising instructions to:
receive, via the network interface, a print job after the finite amount of time has elapsed; and
store the print job in a queue.

13. The imaging device of claim 12, further comprising instructions to release the print job upon a second authorization of the user at the imaging device.

14. The imaging device of claim 11, further comprising a user interface, and further comprising instructions to receive an identifier, via the user interface, to authenticate the user for the finite amount of time.

* * * * *